United States Patent [19]

Chaya

[11] Patent Number: 5,208,793

[45] Date of Patent: May 4, 1993

[54] OPTICAL DISK APPARATUS INCLUDING A BRAKING DEVICE FOR FRICTIONALLY SUPPRESSING MOVEMENT OF AN OPTICAL HEAD CARRIAGE

[75] Inventor: Masahiko Chaya, Yokohama, Japan

[73] Assignee: Canon Kabushiki Kaisha, Tokyo, Japan

[21] Appl. No.: 709,196

[22] Filed: Jun. 3, 1991

[30] Foreign Application Priority Data

Jun. 4, 1990 [JP] Japan .................................. 2-144533

[51] Int. Cl.⁵ ............................................... G11B 7/00
[52] U.S. Cl. ................................. 369/44.14; 369/44.22
[58] Field of Search ............... 369/44.11, 44.14–44.22, 369/292, 290, 287, 268, 249, 232, 224, 77.2; 360/77.2; 359/811, 813, 815, 819, 824, 823, 822

[56] References Cited

U.S. PATENT DOCUMENTS

| | | | |
|---|---|---|---|
| 4,914,647 | 4/1990 | Ono et al. ............................ | 369/292 |
| 5,043,964 | 8/1991 | Suzuki ................................ | 369/44.11 |
| 5,056,891 | 10/1991 | Masunaga ........................... | 369/44.16 |
| 5,083,302 | 1/1992 | Tsuyuguchi et al. .............. | 369/44.11 |
| 5,099,468 | 3/1992 | Suzuki et al. ..................... | 369/44.14 |

FOREIGN PATENT DOCUMENTS 0358294  3/1990  European Pat. Off. .......... 369/44.14

Primary Examiner—Aristotelis Psitos
Assistant Examiner—Thang V. Tran
Attorney, Agent, or Firm—Fitzpatrick, Cella, Harper & Scinto

[57] ABSTRACT

An optical disk apparatus for effecting at least one of recording of information and reproduction of information by use of a light beam is disclosed. The apparatus include an optical carriage having at least an optical system including an objective lens for converging a light beam onto a recording medium and a tracking-/focusing actuator for moving the objective lens along a tracking/focusing direction of the recording medium. The apparatus further includes a linear motor for moving the optical head carriage radially of the recording medium and a wiring member extending from the tracking/focusing actuator and the linear motor. A fixing device is further provided so as to fix the wiring member to suppress movement of the optical head carriage in a case of an inoperative condition of the apparatus, such as during transportation.

5 Claims, 4 Drawing Sheets

←— LOCK
RELEASE —→

OPTICAL DISK APPARATUS INCLUDING A BRAKING DEVICE FOR FRICTIONALLY SUPPRESSING MOVEMENT OF AN OPTICAL HEAD CARRIAGE

BACKGROUND OF THE INVENTION

1. Field of the Invention

The present invention relates to an optical disk apparatus, and more particularly to a lock mechanism of an optical head carriage used in such a drive.

2. Related Background Art

In the optical disk apparatus, since information is recorded and reproduced by optical means, a linear voice coil motor is used to drive the optical head carriage, on which an optical system including an objective lens and drive means thereof are mounted, across tracks of a recording medium. It is equipped with a lock mechanism to suppress free movement of the carriage when the optical disk drive is inactive or during transportation in order to prevent damage due to the free movement of the carriage.

An example of a conventional carriage lock mechanism is shown in FIG. 1.

In the conventional lock mechanism, a rack 32 extends on a frame of the apparatus along a direction of movement a carriage 31, and a locking pawl 33 which meshes with the rack 32 is provided on a side of the carriage 31.

In an active state of the apparatus, the rack 32 is retracted so that the locking pawl 33 disengages from the rack 32, and in an inactive state of the drive or during transportation of the apparatus the rack 32 is brought to a position to engage with the locking pawl 33 so that the free movement of the carriage is inhibited.

However, since such a carriage lock mechanism is arranged along the direction of the movement of the carriage 31, it is not possible to arrange linear voice coil motors 36 on both sides of the carriage 31 and hence it is difficult to enhance a drive capability of the carriage 31.

Further, because of the locking pawl 33, the carriage 31 puts a restriction on mounting positions of parts which are to be mounted thereon.

SUMMARY OF THE INVENTION

It is an object of the present invention to provide a novel lock mechanism of an optical head carriage which solves the problems encountered in the prior art.

The above object of the present invention is achieved by an optical disk apparatus for effecting at least one of recording of information and reproduction of information from a recording medium by using a light beam, comprising an optical head carriage having at least an optical system including an objective lens for converging the light beam onto the recording medium and a tracking/focusing actuator for driving the objective lens along a tracking/focusing direction of the recording medium, mounted thereon;

a linear motor for moving the optical head carriage radially of the recording medium, a wiring member extending from the tracking/focusing actuator and the linear motor, and fixing means for fixing the wiring member for suppressing movement of the optical head carriage.

DETAILED DESCRIPTION OF THE PREFERRED EMBODIMENTS

Embodiments of the present invention are now explained in detail with reference to the drawings.

Figure 1:
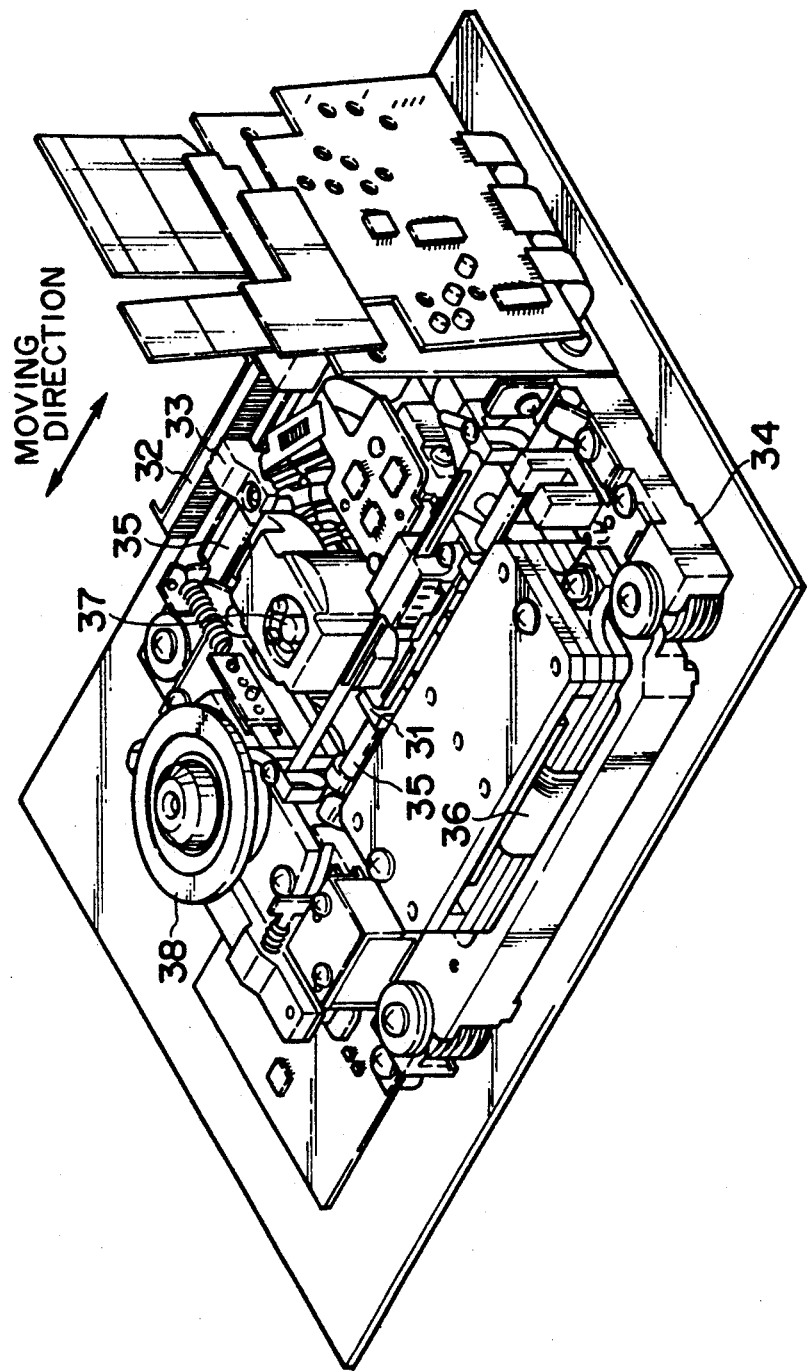
FIG. 1 shows a perspective view of a conventional lock mechanism of an optical head carriage.
Figure 2:
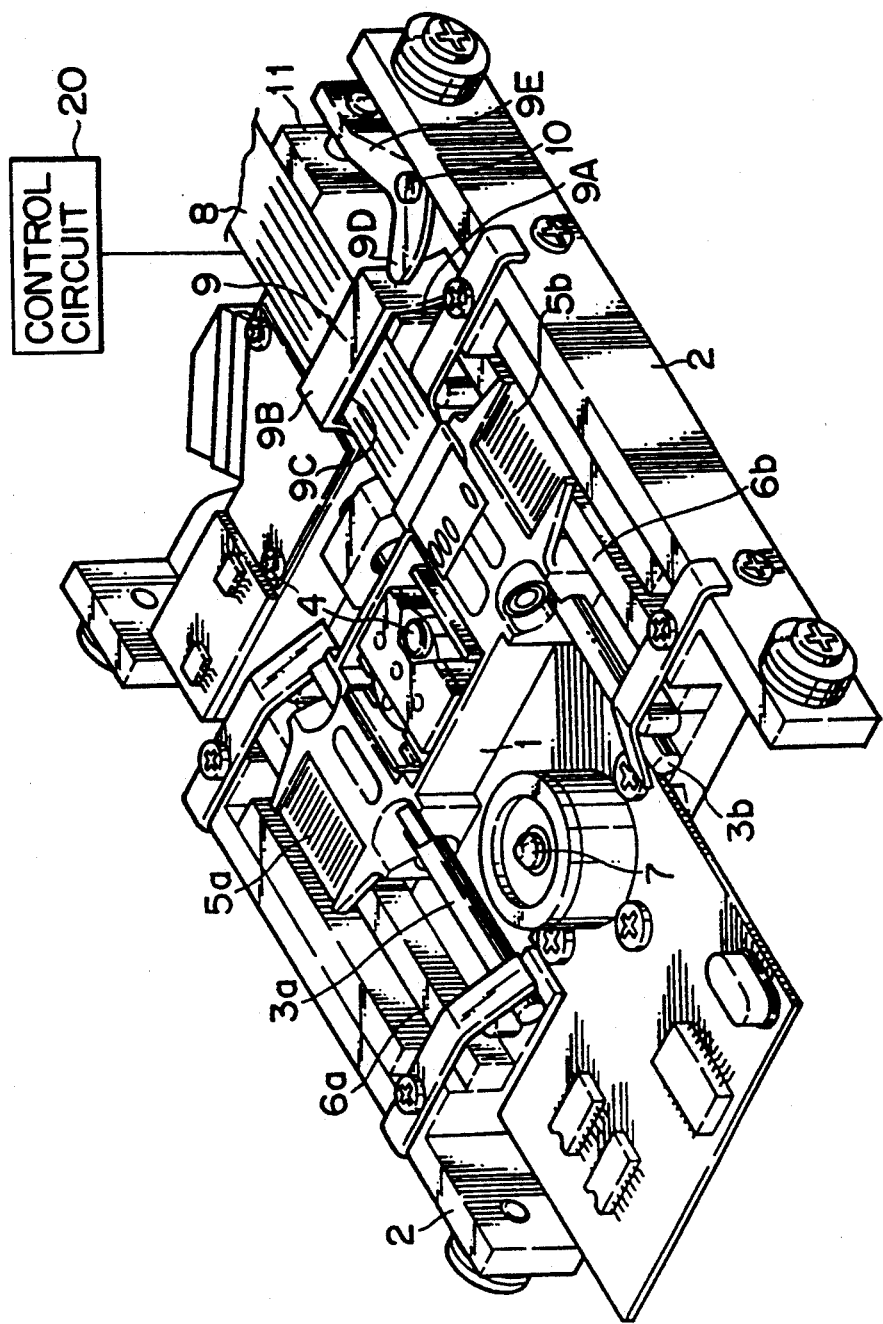
FIG. 2 shows a perspective view of the embodiment of a lock mechanism of the optical head carriage in accordance with the present invention.

In FIG. 2, numeral 1 denotes an optical head carriage which is guided by guide rails 3a and 3b arranged on both sides of a frame 2. An optical system including at least an objective lens 4 for converging a light beam onto a recording medium and a tracking/focusing actuator for driving the objective lens in a tracking/focusing direction of the recording medium are mounted on the optical head carriage. Linear voice coil motors 5a and 5b for a seek operation are arranged on both sides of the optical system, and paired with magnetic cores 6a and 6b, respectively, mounted on the frame 2. The elements to be mounted on the optical head carriage depend on the type of the optical head (such as a separate light source type head).

A spindle motor 7 for driving a disk (not shown) is mounted at the center of the frame 2. A wiring member comprising a flexible printed circuit board 8 which extends along the direction of movement of the optical head carriage 1 has one end thereof attached to the optical head carriage 1. The other end is attached to the frame 2. The printed circuit board is provided for the tracking/focusing actuator and the linear voice coil motor. That is, it is provided to transmit drive signals sent from a control circuit 20 to the tracking/focusing actuator and the linear voice coil motor. A braking member 9 is arranged on the frame 2 to surround the printed circuit board 8.

Figure 3A:
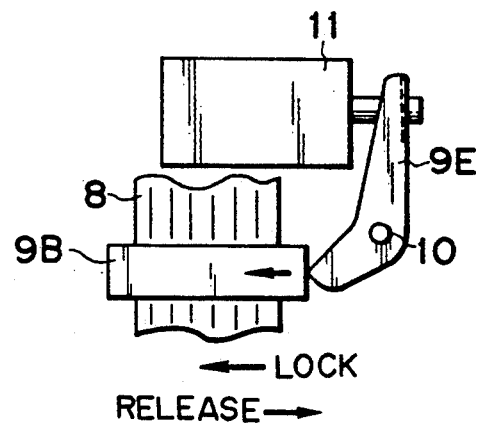
FIGS. 3A, 3B and 3C show longitudinal sectional views of details of the lock mechanism shown in FIG. 2.
Figure 3B:
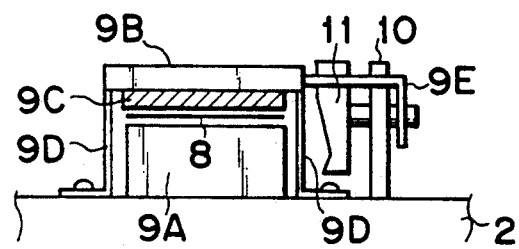

As shown in FIGS. 3A and 3B, the braking member 9 has a stopper mount 9A which is located below the printed circuit board 8 and has a flat top surface and a stopper 9B which is located above the printed circuit board 8. The stopper 9B has a friction plate 9C attached to a bottom surface thereof so that it brakes by friction when it contacts the printed circuit board 8. To this end, the stopper 9B is supported on the frame 2 by leaf springs 9D and urged horizontally by an actuation arm 9E.

The actuation arm 9E is rotatably supported by a shaft 10 which perpendicularly protrudes from the frame 2, and one end thereof is attached to a movable shaft of a solenoid 11 which is mounted on the frame 2.

When the apparatus is in the operative state, the stopper 9B is separated from the printed circuit board 8. Accordingly, the optical head carriage 1 is moved along the guide rail 3 by the linear voice coil motor 7 to allow access of the objective lens 4 to the disk.

Figure 3C:
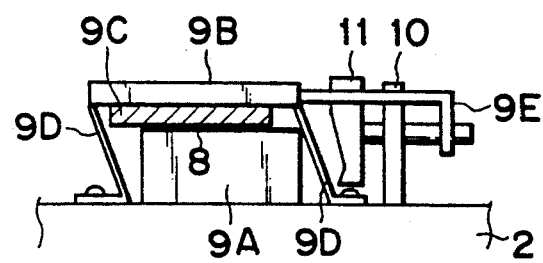

When the apparatus is in the inoperative state or it is transported, the actuation arm 9E is arranged as shown in FIG. 3C to urge the stopper 9B so that the leaf springs 9D are flexed and the friction plate 9C is urged to the printed circuit board 8. As a result, the printed circuit board 8 is held between the stopper 9B and the stopper mount 9A and fixed therebetween so that the optical head carriage 1 is braked.

When the actuation arm 9E is so arranged, the apparatus is inactive, accordingly, it is preferable that the actuation arm 9E is separated from the stopper 9B when the solenoid 11 is activated.

Figure 4:
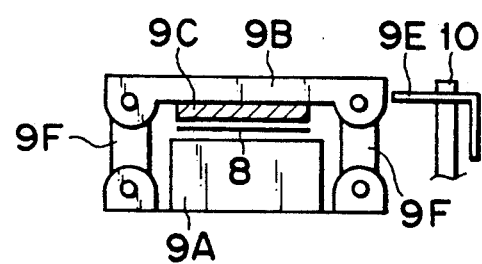
FIG. 4 shows a sectional view of another embodiment of the lock mechanism of the optical head carriage of the present invention.

In an embodiment shown in FIG. 4, the braking member uses parallelogram link members 9F to support the stopper 9B. The link members are preferably resiliently supported by spring members so that they are normally held upstanding.

Various modifications of the present invention may be made without departing from the claims.

What is claimed is:

1. An optical disk apparatus for effecting at least one of recording of information on and reproduction of information from a recording medium by using a light beam, said apparatus comprising:

a support frame;

an optical head carriage mounted on said support frame, said optical head carriage having at least an optical system, including an objective lens for converging the light beam onto the recording medium in a focusing direction and a tracking/focusing actuator for driving the objective lens along one of the focusing direction and a tracking direction of the light beam relative to the recording medium, mounted thereon;

a linear motor mounted on said optical head carriage for moving said optical head carriage radially of the recording medium;

a wiring member extending from said tracking/focusing actuator and said linear motor, and being attached at one end to said support frame and at another end to said optical head carriage; and braking means mounted to said support for frictionally engaging said wiring member, said braking means comprising means for suppressing movement of said optical head carriage when frictionally engaged with said wiring member.

2. An optical disk apparatus according to claim 1, wherein said braking means comprises a first member and a second member for frictionally engaging said wiring member therebetween.

3. An optical disk apparatus according to claim 1, wherein said wiring member comprising a flexible printed circuit board.

4. An optical disk apparatus according to claim 1, further comprising a control circuit to which said wiring member is connected to transmit control signals from the control circuit to said tracking/focusing actuator and said linear motor.

5. An optical disk apparatus according to claim 1, wherein said wiring member extends along the direction of movement of said optical head carriage.

* * * * *

UNITED STATES PATENT AND TRADEMARK OFFICE
CERTIFICATE OF CORRECTION

PATENT NO. : 5,208,793  
DATED : May 4, 1993  
INVENTOR(S) : Masahiko Chaya

Page 1 of 2

It is certified that error appears in the above-indentified patent and that said Letters Patent is hereby corrected as shown below:

ON THE COVER PAGE, item [57], col. 2,

IN THE ABSTRACT

Line 4, "include" should read --includes--.

COLUMN 1

Line 28, "a carriage 31," should read --of a carriage 31,--;  
　　Line 34, "apparatus" should read --apparatus,--; and  
　　Line 54, "information" should read --information on--.

COLUMN 2

Line 64, "it" should be deleted.

UNITED STATES PATENT AND TRADEMARK OFFICE
CERTIFICATE OF CORRECTION

PATENT NO. : 5,208,793
DATED : May 4, 1993
INVENTOR(S) : Masahiko Chaya

It is certified that error appears in the above-indentified patent and that said Letters Patent is hereby corrected as shown below:

COLUMN 4

Line 20, "comprising" should read --comprises--.

Signed and Sealed this

Fifteenth Day of March, 1994

Attest:

BRUCE LEHMAN

*Attesting Officer*  *Commissioner of Patents and Trademarks*